3,471,584
JOINT SEPARATION OF ACETYLENE AND ETHYLENE FROM CRACKED GASES
Rolf Platz, Mannheim, and Kurt Taglieber and Kurt Weinfurter, Ludwigshafen (Rhine), Germany, assignors to Badische Anilin- & Soda-Fabrik Aktiengesellschaft, Ludwigshafen (Rhine), Germany
Filed Aug. 9, 1967, Ser. No. 659,394
Claims priority, application Germany, Aug. 12, 1966, B 88,454
Int. Cl. B01d 53/00; C07c 7/02, 7/04
U.S. Cl. 260—679                                         3 Claims

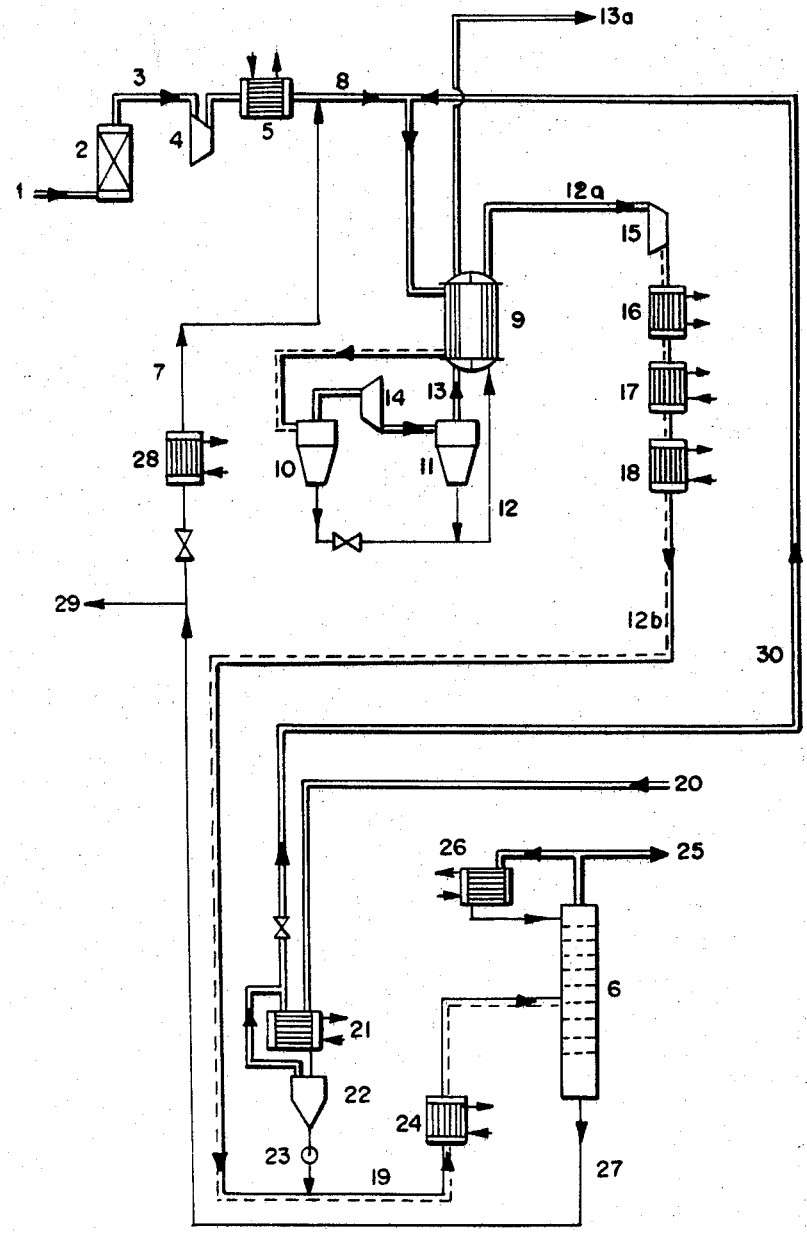

ABSTRACT OF THE DISCLOSURE

A new process for joint separation of acetylene and ethylene from cracked gas obtained in the submerged-flame process and from which carbon dioxide and hydrogen sulfide have been removed. The cracked gas is dried, part of the methane and the whole of the remaining hydrocarbons are separated by condensation, and then the acetylene and ethylene together with methane and ethane are separated by pressure distillation from a liquid fraction which contains the whole of the hydrocarbons having three to five carbon atoms and any carbon oxysulfide and carbon disulfide.

---

In the cracking of liquid hydrocarbons such as crude oil or crude oil fractions in a flame burning beneath the surface of the liquid (submerged flame), a cracked gas is obtained which, besides acetylene and ethylene as the main components, contains hydrogen, carbon monoxide, carbon dioxide, various sulfur compounds, methane, ethane and hydrocarbons having three to five carbon atoms.

It is known that such gas mixtures may be separated into their constituents in stages, the hydrocarbons having three to five carbon atoms being in general separated first by scrubbing with oil and the acetylene then being removed from the remaining gas mixture by scrubbing with N-methylpyrrolidone. The separate ethylene from the residual gas mixture (which contains carbon monoxide and hydrogen as main constituents), condensation at low temperatures is necessary. This method has the disadvantage however that disproportionately large apparatus is required for the preceding stagewise separation of the $C_3$–$C_5$ fraction by scrubbing with oil and for the separation of the acetylene fraction, because in both stages the main portion of the gas, namely hydrogen and carbon monoxide, also has to pass through. However, sulfur compounds contained in the cracked gas—other than hydrogen sulfide, which usually has been previously removed by selective $H_2S$ scrubbing—are distributed between the acetylene fraction and the mixture of hydrogen and carbon monoxide. This necessitates in every case removal of sulfur from the acetylene fraction and removal of sulfur from the mixture of hydrogen and carbon monoxide if this is to be used for synthesis.

It is an object of this invention to provide a method of processing cracked gases obtained according to the submerged-flame method which does not have the said disadavantages.

We have found that this object can be achieved and the acetylene and ethylene can be separated from the cracked gas in a simple way, after removal of carbon dioxide and hydrogen sulfide, by drying the cracked gas, separating part of the methane and the whole of the other hydrocarbons by condensation and then separating the acetylene and ethylene together with methane and ethane by pressure distillation of a liquid fraction which contains all the hydrocarbons having three to five carbon atoms and any carbon oxysulfide and carbon disulfide.

In carrying out the process, the necessary preliminary separation of carbon dioxide and sulfur which is present in the form of hydrogen sulfide may be carried out in a conventional manner by scrubbing, for example with an aqueous solution of an alkali metal salt of an amino acid. If necessary, this scrubbing in which most of the carbon dioxide together with the hydrogen sulfide is separated, may be followed by further carbon dioxide removal, which is advantageously carried out by scrubbing with a dilute solution of an alkali metal hydroxide.

Prior to condensation the cracked gas freed from carbon dioxide and hydrogen sulfide is dried. This drying may be carried out by a conventional method, e.g., by scrubbing the gas with diethylene glycol or triethylene glycol. The dried cracked gas is then cooled, advantageously at the pressure used in the cracking, for example at 5 to 15 atmospheres, to such an extent that the hydrocarbon fraction, with the exception of part of the methane contained in the cracked gas, is separated in liquid phase. It is advantageous to pass the dried cracked gas through one or more heat exchangers in which the cold which is due to expansion of the uncondensed fraction (i.e., mainly hydrogen and carbon monoxide) is utilized for separation of the hydrocarbons. The effect may if desired be enhanced in cases where the process pressure of the cracked gas is inadequate, by interposing, upstream of the condensation stage, a compressor and/or preliminary cooling means. It is also possible however to use a heat exchanger in which the cooling of the cracked gas by the expanded hydrogen and carbon monoxide is increased by evaporation of the liquid fraction separated. In the expansion of the uncondensed fraction of the cracked gas after condensation, hydrogen and carbon monoxide are obtained which still contain the bulk of the methane but are free from sulfur compounds, such as carbon oxysulfide and carbon disulfide which dissolve in the liquid fraction. Condensation of the dried cracked gas is in general carried out at temperatures of from $-100°$ to $-140°$ C., for example at $-104°$ to $-138°$ C., depending on the acetylene content.

After the liquefied mixture of hydrocarbons having three to five carbon atoms has been vaporized in the heat exchanger, it is recompressed to the pressure required for distillation, for example to 5 to 40 atmospheres, and introduced into a sieve plate column or bubble-tray column.

In distillation, the whole fraction of hydrocarbons having two carbon atoms is withdrawn as the overhead product, while the hydrocarbons having three to five carbon atoms (containing carbon oxysulfide and carbon disulfide dissolved therein) are obtained as the bottoms product. It is advantageous to recycle this liquid bottoms product to the cracking unit. This method has the advantage that more complete exploitation is achieved and the conversion of carbon oxysulfide and carbon disulfide, which would have to be carried out in any case, occurs in the submerged flame. The whole of the COS and $CS_2$ is thus converted in the submerged flame into hydrogen sulfide and carbon dioxide which are then separated in the conventional manner.

Further separation of the hydrocarbon fraction having two carbon atoms and recovery of pure acetylene and ethylene can now be carried out by a conventional method, for example by solvent scrubbing with acetone or methanol.

An important advantage of the process according to the invention in which part of the methane and the whole of the remaining hydrocarbons are separated together in a single condensation stage, consists in the fact that additional dilution of the acetylene in the liquid phase is achieved by the separation of the hydrocarbons having three to five carbon atoms. Safety in operation is therefore better than in the conventional methods. If however excessively high and critical acetylene concentrations are set up at individual places in condensation and pressure distillation, depending on the acetylene content of the cracked gas, these can be decreased by recycling hydrocarbons; for example, the acetylene concentration in the liquid phase of the separator of the condensation stage can be lowered by returning part of the bottoms from the pressure distillation unit and the acetylene content in the distillation column can be lowered by returning part of the liquid ethylene. Any higher acetylenes which may have been formed also accumulate in the bottoms of the pressure distillation unit and, when critical concentrations are exceeded, may be diluted in the same way with hydrocarbons, for example gasoline, and returned with the fraction of hydrocarbons having three to five carbon atoms to the burner.

The invention is illustrated by the following example given with reference to the drawing.

EXAMPLE 14,000 cubic meters (S.T.P.) per hour of cracked gas from line 1 (obtained by cracking Libyan crude oil in the flame of a submerged burner which is burning beneath the surface of the liquid, and freed from carbon dioxide and hydrogen sulfide in a conventional manner) is scrubbed in a drying tower 2 with diethylene glycol. The dry gas is passed through line 3 at 8 atmospheres and 25° C. into a compressor 4 and then has the following composition:

| Substance: | Percent by volume |
|---|---|
| $CO$ | 40.5 |
| $O_2$ | 0.21 |
| $H_2$ | 29.2 |
| $N_2$ | 0.59 |
| $COS$ and $CS_2$ | 0.03 |
| $CH_4$ | 3.96 |
| $C_2H_2$ | 6.95 |
| $C_2H_4$ | 6.43 |
| $C_2H_6$ | 0.49 |
| $C_3-C_5$ hydrocarbons | 11.64 |

The gas is compressed to 11 atmospheres in compressor 4 and cooled to 35° C. in after-cooler 5. In order to ensure that no acetylene crystals are formed in the subsequent condensation, an acetylene content of 20% is set up in the condensable gas fraction of the cracked gas by returning through line 7 part of the hydrocarbons having three to five carbon atoms obtained as bottoms in the distillation column 6. The cracked gas in line 8 then has the following composition:

| Substance: | Percent by volume |
|---|---|
| $CO$ | 37.00 |
| $O_2$ | 0.19 |
| $H_2$ | 26.6 |
| $N_2$ | 0.53 |
| $COS$ and $CS_2$ | 0.03 |
| $CH_4$ | 3.63 |
| $C_2H_2$ | 6.35 |
| $C_2H_4$ | 5.85 |
| $C_2H_6$ | 0.45 |
| $C_3-C_5$ hydrocarbons | 19.37 |

The gas entering heat exchanger 9 is cooled to −125° C. countercurrent to the hydrocarbons from the separators 10 and 11, supplied through line 12, and the uncondensable gas fraction from line 13. 25 cubic meters (S.T.P.) per hour of methane dissolves at this temperature in the liquid phase in the separator 10.

The liquid phase in the separator 10 has the following composition:

| Substance: | Percent by volume |
|---|---|
| $CH_4$ | 0.52 |
| $C_2H_2$ | 19.83 |
| $C_2H_4$ | 17.40 |
| $C_2H_6$ | 1.38 |
| $C_3-C_5$ hydrocarbons | 60.78 |
| $COS$ and $CS_2$ | 0.09 |

The gas phase in the separator 10 has the following composition:

| Substance: | Percent by volume |
|---|---|
| $CO$ | 54.334 |
| $O_2$ | 0.286 |
| $H_2$ | 39.000 |
| $N_2$ | 0.790 |
| $CH_4$ | 5.06 |
| $C_2H_2$ | 0.043 |
| $C_2H_4$ | 0.473 |
| $C_2H_6$ | 0.014 |

This gas is expanded in the expansion turbine 14 from 11 to 2.0 atmospheres while performing external work and is thus cooled to −168° C. The remainder of $C_2H_2$, $C_2H_4$ and $C_2H_6$ thus condenses. It is separated from the gas in separator 11 and supplied to the condensate from 10 in line 12. The fraction of hydrocarbons having two carbon atoms has been decreased to less than 0.08% by volume in this two-stage separation of condensable constituents. This gas is then passed through line 13 into heat exchanger 9 where together with the evaporating liquid from separators 10 and 11 it cools the incoming cracked gas. After having passed through the heat exchanger 9, the gas leaves the plant at 13a at a temperature of 25° C.

The hydrocarbons vaporized in the heaat exchanger 9 pass through line 12a into a compressor 15 in which they are compressed to 18 atmospheres. They are then cooled in the heat exchanger 16 with water and in heat exchangers 17 and 18 successively with ethane and ethylene obtained in the processing of hydrocarbons having two carbon atoms.

The mixture of hydrocarbons with the remaining sulfur compounds passes through lines 12b and 19 into a pressure distillation column 6. To lower the concentration of acetylene in the upper part of the column 6 both in the liquid phase and in the vapor phase, a mixture of ethylene, ethane and methane from a subsequent acetone scrubber for separating acetylene is passed through line 20, condensed in condenser 21, collected in separator 22 and supplied by pump 23 line 19. Methane liberated in heat exchanger 21 is returned through line 30.

The acetylene-containing mixture which has been diluted with returned hydrocarbons having two carbon atoms has the following composition prior to introduction into the pressure distillation column:

| Substance: | Percent by volume |
|---|---|
| $CH_4$ | 1.1 |
| $C_2H_2$ | 12.0 |
| $C_2H_4$ | 45.0 |
| $C_2H_6$ | 5.3 |
| $C_3-C_5$ hydrocarbons | 36.5 |
| $COS$ and $CS_2$ | p.p.m. 550 |

Prior to being introduced into the pressure distillation unit, the mixture is cooled down to −23° C. in heat exchanger 24 and then supplied to the middle of the column 6.

The $C_2$ fraction containing acetylene and ethylene is separated from the mixture by pressure distillation and is withdrawn at the top of the plant through line 25 and supplied to a conventional separation unit with an acetone scrubber and a low-temperature distillation unit to recover pure sulfur-free acetylene and ethylene. The necessary reflux for distillation in the column 6 is produced by the condenser 26.

The mixture of $C_3$–$C_5$ hydrocarbons (which contains all sulfur present in the form of COS and $CS_2$) is withdrawn in an amount of 6417 kg. per hour from the bottom of the distillation column 6. The mixture contains:

| Substance: | Percent by volume |
|---|---|
| $C_3$ hydrocarbons | 55 |
| $C_4$ hydrocarbons | 39.4 |
| $C_5$ hydrocarbons | 5.5 |
| COS and $CS_2$ | 0.1 |

Part of this mixture is vaporized in heat exchanger 28 and supplied through line 7 to the cracked gas in line 8. The remainder of the mixture is recycled in liquid form in an amount of 3500 kg./hour through line 29 to the burner of the cracking unit in which the hydrocarbon component is cracked and the COS and $CS_2$ are converted into $H_2S$.

We claim:

1. A process for joint separation of acetylene and ethylene from cracked gas containing acetylene, ethylene, hydrogen, carbon monoxide, carbon dioxide, carbon oxysulfide, carbon disulfide, methane, ethane, and hydrocarbons having three to five carbon atoms, and obtained in the cracking of liquid hydrocarbons by a flame burning beneath the surface of the same and from which carbon dioxide and hydrogen sulfide have been removed, wherein the cracked gas is dried, part of the methane and the whole of the remaining hydrocarbons are separated by condensation at temperatures of from $-104°$ to $-138°$ C. and then the acetylene and ethylene together with methane and ethane are separated by pressure distillation from a liquid fraction which contains the whole of the hydrocarbons having three to five carbon atoms and any carbon oxysulfide and carbon disulfide.

2. A process as claimed in claim 1 wherein the pressure distillation for the separation of acetylene and ethylene together with methane and ethane is carried out at 5 to 40 atmospheres.

3. A process as claimed in claim 4 wherein the pressure distillation for the separation of acetylene and ethylene together with methane and ethane is carried out at 5 to 40 atmospheres and the liquid fraction which contains the whole of hydrocarbons having three to five carbon atoms and any carbon oxysulfide and carbon disulfide is returned to the feed of liquid hydrocarbons for cracking in the submerged flame.

References Cited
UNITED STATES PATENTS

| | | | |
|---|---|---|---|
| 3,272,885 | 9/1966 | Davison | 260—679 |
| 3,320,754 | 5/1967 | Tucker et al | 62—28 |
| 3,152,194 | 9/1964 | Pohl et al. | 260—679 |

DELBERT E. GANTZ, Primary Examiner

J. M. NELSON, Assistant Examiner

U.S. Cl. X.R.

62—28; 260—683

PO-1050
(5/69)

UNITED STATES PATENT OFFICE
CERTIFICATE OF CORRECTION

Patent No. 3,471,584　　　　　　Dated October 7, 1969

Inventor(s)　Rolf Platz et al

It is certified that error appears in the above-identified patent and that said Letters Patent are hereby corrected as shown below:

Column 1, line 41, "The" should read --To--.

Column 6, line 9, claim 3, "4" should read "1".

SIGNED AND
SEALED
FEB 17 1970

(SEAL)
Attest:

Edward M. Fletcher, Jr.
Attesting Officer

WILLIAM E. SCHUYLER, JR.
Commissioner of Patents